UNITED STATES PATENT OFFICE.

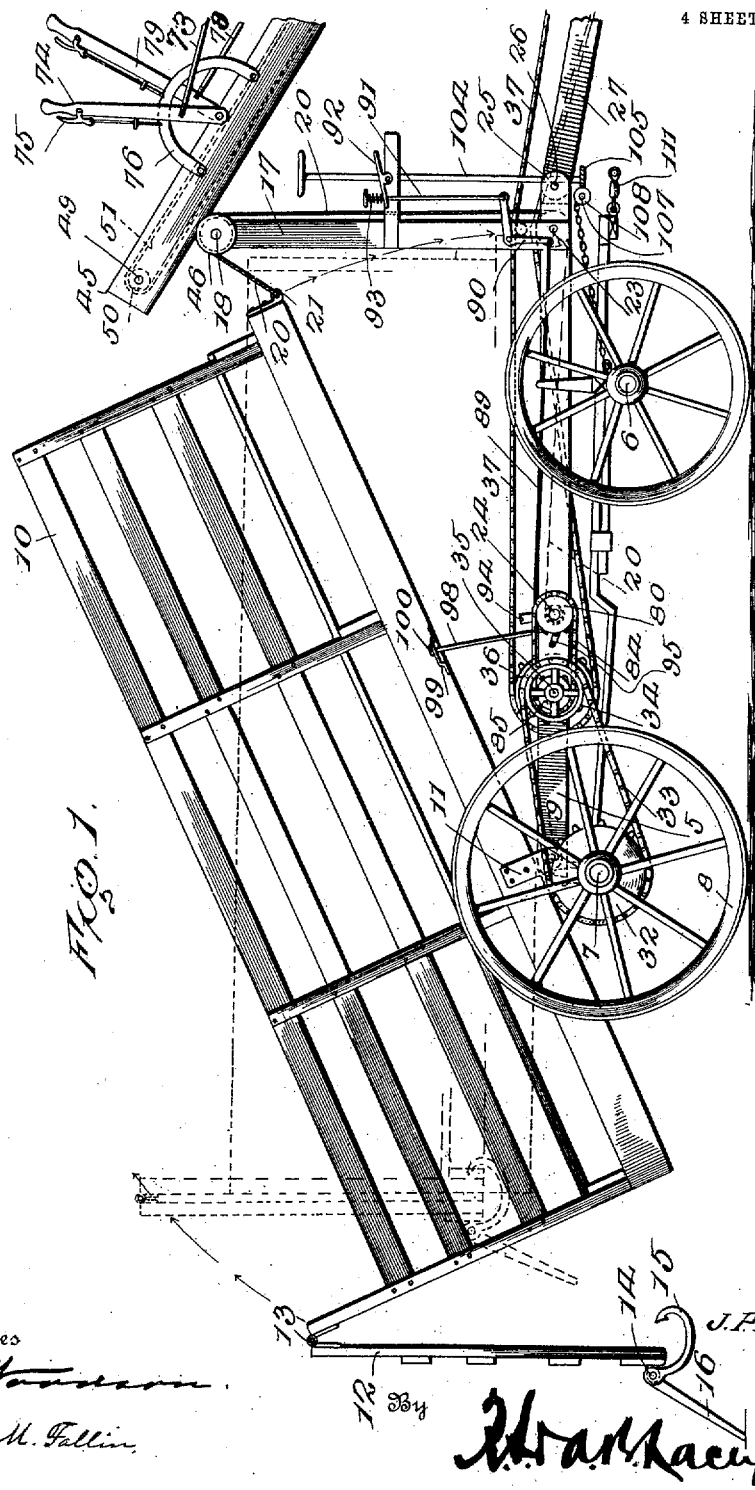

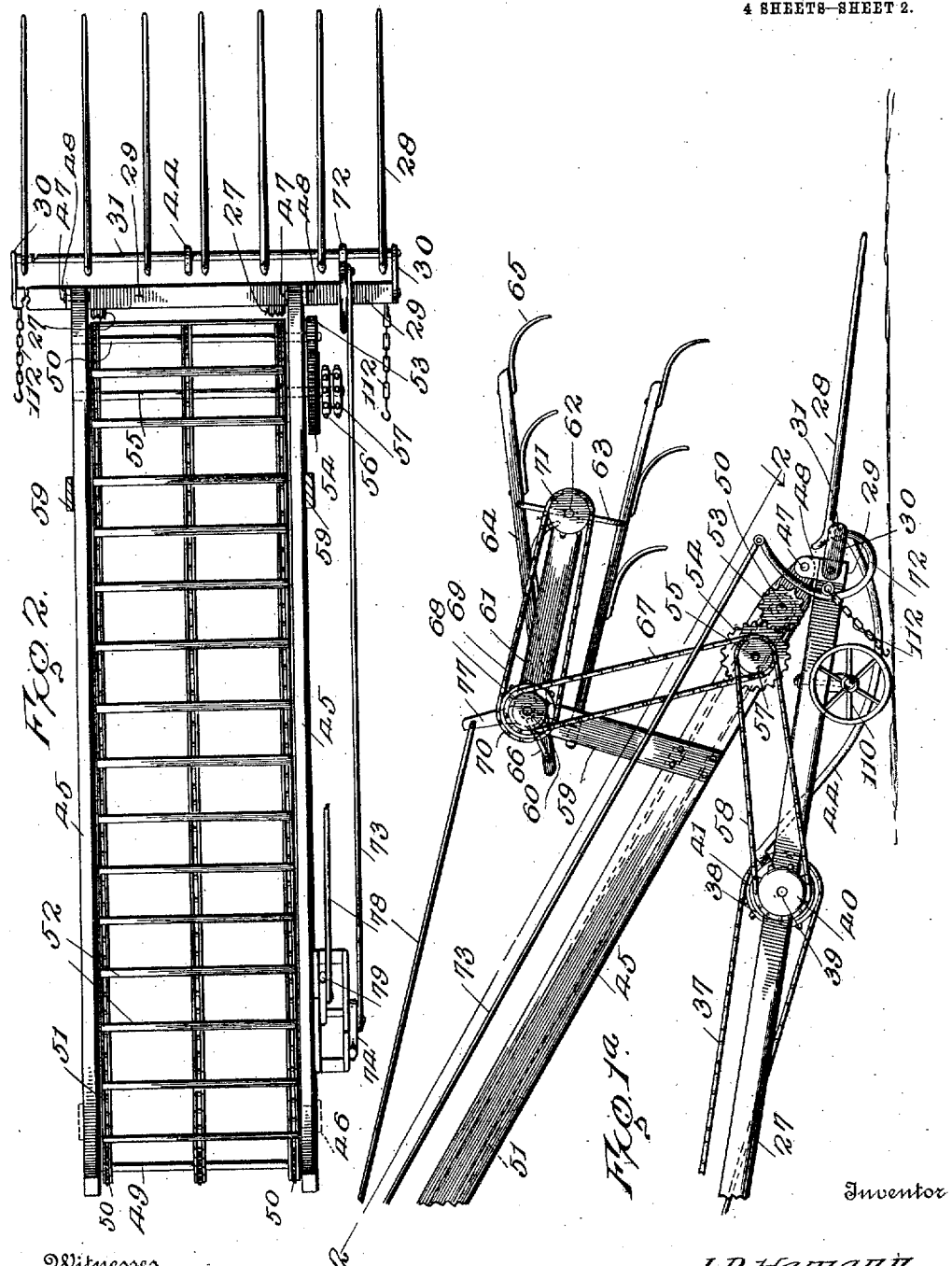

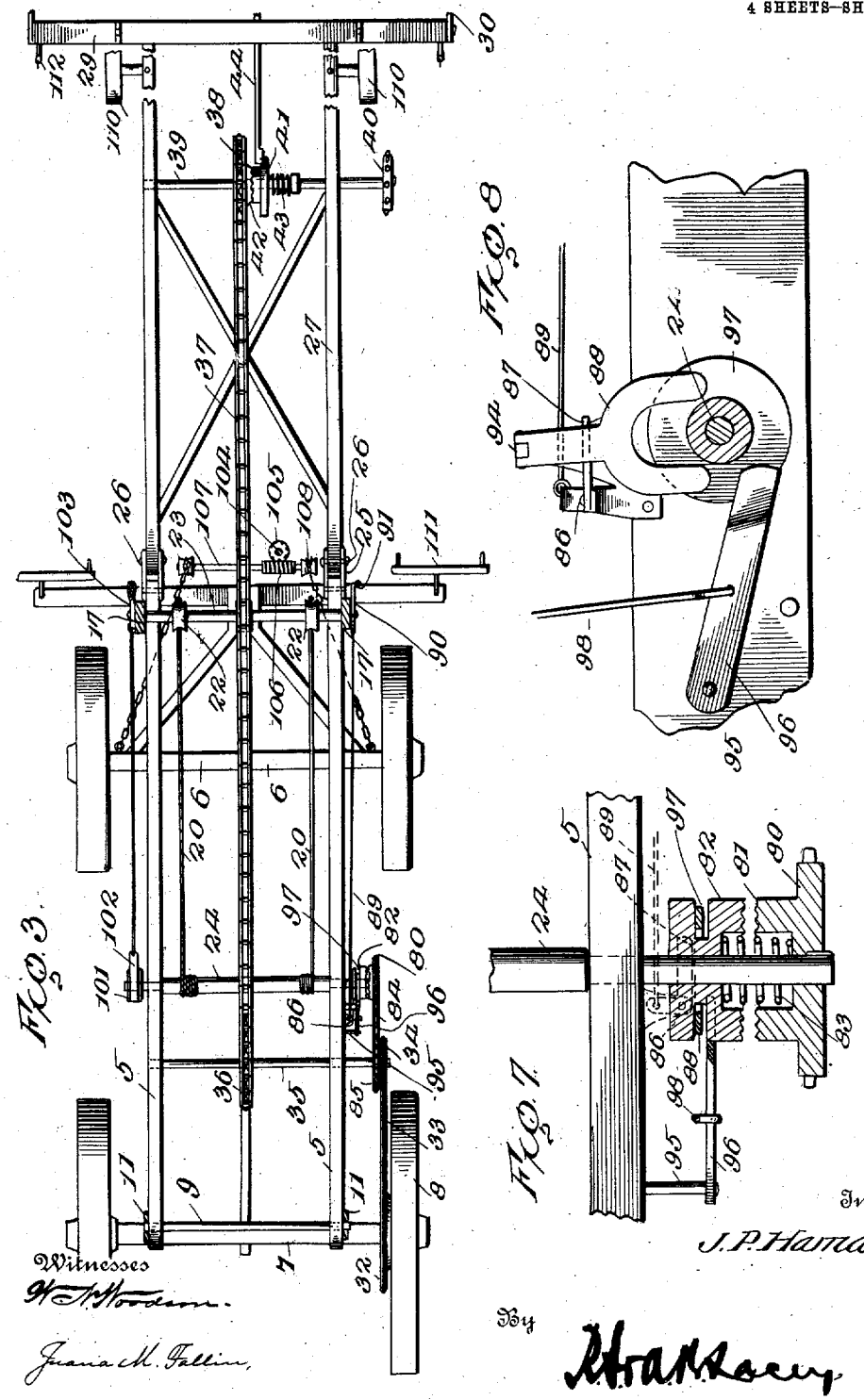

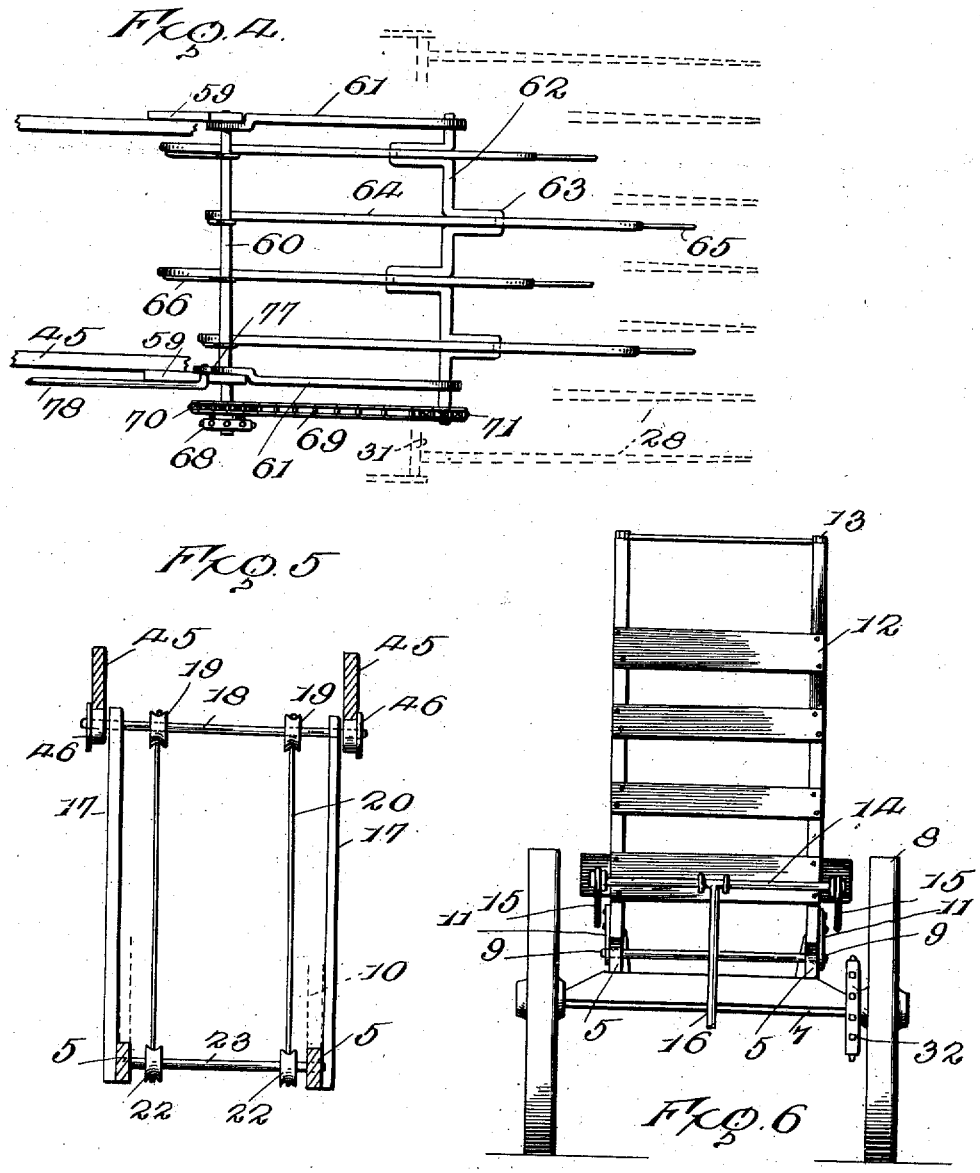

JOHN P. HAMANN, OF CHASELEY, NORTH DAKOTA.

GRAIN-SHOCK LOADER.

986,167.     Specification of Letters Patent.     Patented Mar. 7, 1911.

Application filed May 19, 1910. Serial No. 562,294.

*To all whom it may concern:*

Be it known that I, JOHN P. HAMANN, a citizen of the United States, residing at Chaseley, in the county of Wells and State of North Dakota, have invented certain new and useful Improvements in Grain-Shock Loaders, of which the following is a specification.

This invention relates to shock loaders and has for its object the provision of a strong, durable and thoroughly efficient machine of this character, designed to travel over a field and collect the shocks deposited thereon.

A further object of the invention is to provide a shock loader including a wheeled truck having a rack or receptacle pivotally mounted thereon and adapted to receive the shocks from the elevating mechanism, means being provided for elevating the front end of the rack, thereby to tilt the latter and dump the load.

A further object is to provide a shock loader having a fork pivotally mounted on the forward end thereof for gathering the shocks, there being a plurality of rake bars mounted above the gathering device and coacting with the latter for feeding the shocks to the endless conveyer for delivery to the rack.

A further object is to provide means for raising and lowering the gathering device, means for adjusting the rake bars vertically of said gathering device, and means for automatically opening the end gate of the rack when said rack is tilted to discharge the contents thereof.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a side elevation of the rear portion of a shock loader constructed in accordance with my invention; Fig. 1ª is a side elevation of the front portion thereof; Fig. 2 is a top plan view of the conveyer and gathering device, the reciprocating rake bars being omitted for the sake of clearness; Fig. 3 is a top plan view of the machine with the rack, elevating mechanism and gathering device removed; Fig. 4 is a top plan view of the rake bars; Fig. 5 is a detail vertical sectional view, showing the manner of supporting the upper end of the conveyer on the standards at the front end of the truck; Fig. 6 is a rear view of the machine, showing the construction of the locking mechanism for the end gate; Fig. 7 is a horizontal sectional view of the clutch members for actuating the winding drum, the active faces of the clutch members being separated; Fig. 8 is a side elevation, partly in section, of the mechanism for throwing the clutch members into and out of engagement.

Corresponding and like parts are referred to in the following description and indicated in all the views of the drawings by the same reference characters.

The shock loader forming the subject matter of the present invention comprises a truck including spaced longitudinal bars 5 having front and rear axles 6 and 7 extending beneath the same and on which are journaled ground wheels 8.

Extending across the truck above the rear axle 7, is a transverse rod 9 on which is pivotally mounted for tilting movement, a rack 10 adapted to receive the shocks from the elevating mechanism. Depending from the opposite sides of the rack 10 are clips 11 having openings formed therein for the reception of the rod 9, said rods forming the pivotal axis of the rack. The rack 10 is provided with an end gate 12, the upper end of which is pivotally mounted at 13, while the lower end thereof is provided with a locking member preferably in the form of a rod 14, journaled in suitable bearings on the end gate and provided with oppositely disposed hooks 15 adapted to normally embrace the body of the rack, thus to lock the end gate in closed position. Depending from the intermediate portion of the rod 14 is an inclined arm 16 which bears against the surface of the ground when the rack is tilted, thus to automatically release the hooks 15 and allow the end gate to swing to open position to permit the discharge of the contents of the rack.

Secured to the side bars 5 at the forward end of the truck, are spaced standards 17, between which the forward end of the rack 10 extends, said standards forming guides for said rack when the latter is tilted to effect the dumping of the load. Mounted in the upper ends of the standards 17, is a transverse shaft 18 having spaced rollers 19 secured thereto and over which extend cords or cables 20. One end of each cord or cable 20 is fastened in any suitable manner at 21 to the forward end of the rack 10, while the opposite ends of the cables extend over pulleys 22 mounted on a transverse shaft 23 at the bottom of the standards 17 and thence extend rearwardly between the longitudinal bars 5 for attachment to a winding drum 24.

Extending longitudinally from the forward end of the truck and secured in any suitable manner to the side bars 5 thereof, are spaced ears 25, between which are pivotally mounted at 26 a tilting frame 27 carrying a fork or gathering device, indicated at 28. The gathering device 28 is pivotally connected with the forward transverse beam 29 of the frame 27 by oppositely disposed links 30 so as to permit free tilting movement of said gathering device when it is desired to raise or lower the same. The gathering device may be of any suitable construction, but in the present form is shown comprising a plurality of teeth or tines spaced apart and either rigidly or loosely mounted on a transverse supporting rod 31.

Secured to one of the rear ground wheels 8, is a relatively large sprocket wheel 32, which latter is connected through the medium of a sprocket chain 33 with a relatively small sprocket wheel 34 mounted on a shaft 35 journaled between the side bars of the truck. Fastened on the intermediate portion of the transverse shaft 35 is a sprocket wheel 36, over which extends a sprocket chain 37 for connection with a similar sprocket wheel 38 mounted on a transverse shaft 39 journaled in the pivoted frame 27. One end of the shaft 39 is projected laterally beyond the adjacent longitudinal edge of the pivoted frame 27 to form a support for a sprocket wheel 40, there being a clutch member 41 mounted on the shaft 39 and engaging a mating clutch member 42 secured to the sprocket wheel 38 for the purpose of transmitting motion from the ground wheels of the truck to the shaft 39. The mating clutch members are normally held in contact with each other by a spring 43, there being a lever 44 operatively connected with the clutch members for moving the latter into and out of engagement with each other.

Disposed above the pivoted frame 27, is an inclined conveyer frame 45, the upper end of which is supported on flanged rollers 46 secured to the opposite ends of the transverse shaft 18. The lower end of the conveyer is pivotally mounted at 47 on spaced ears 48 extending vertically from the adjacent end of the tilting frame 27. The conveyer comprises spaced shafts 49 and 50 having sprocket wheels secured thereto and over which travel a plurality of sprocket chains 51 to which are secured a series of transverse flights 52 of any suitable construction for delivering the shocks from the gathering device 28 to the receiving rack 10.

Secured to one end of the shaft 50 is a gear wheel 53 which meshes with a master gear 54 mounted on a shaft 55 carried by the conveyer frame, there being spaced sprocket wheels 56 and 57 secured to the shaft 50 in spaced relation to the gear wheel 54, as best shown in Fig. 2 of the drawings.

A sprocket chain 58 forms a connection between the sprocket wheels 40 and 57 so that motion will be transmitted from the rear ground wheels of the truck through the medium of the sprocket chains 37 and 58 to the shaft 55 and thence through the intermeshing gears 54 and 53 to the conveyer for rotating the latter.

Secured to the opposite sides of the conveyer frame are upright bars 59 connected by a transverse rod or shaft 60 on which are pivotally mounted overhanging arms 61. Journaled in the free ends of the arms 61, is a crank shaft 62, to the offset portions 63 of which are pivotally connected a series of spaced rake bars 64 having their front ends provided with downwardly curved teeth 65 and their rear ends pivotally connected with the transverse rod 60 through the medium of links 66.

Motion is transmitted from the shaft 55 by means of a sprocket chain 67 which extends over the sprocket wheel 56 and over a corresponding sprocket wheel 68 secured to one end of the oscillating rod 60, there being a similar sprocket chain 69 forming a connection between sprocket wheels 70 and 71 carried by the shafts 60 and 62, as best shown in Fig. 4 of the drawings. Thus it will be seen that as the machine travels over a field or other inclosure, the forks 28 will gather the shocks, while the oscillating rake bars 64 will deposit the shocks on the conveyer for delivery to the rack.

As a means for elevating the front end of the fork or gathering device, as for instance, when transferring the machine from one portion of a field to another, there is provided an actuating member 72 having its lower end curved laterally and upwardly for pivotal connection with the rod 31 of the gathering device and its upper end extended forwardly and provided with a terminal eye to which is pivotally connected a longitudinally disposed actuating rod 73. The actuating rod 73 is connected with an operating lever 74 pivotally mounted on the upper end of the conveyer frame so that by manipulating the lever 74, the teeth of the gathering device may be raised or lowered.

The lever 74 is provided with a hand latch 75, the lower end of which engages a segmental rack 76 for the purpose of holding the gathering device in either raised or lowered position.

Extending vertically from the oscillating rod or shaft 60 is an arm 77 to which is attached one end of a rod 78, the opposite end of which is connected with a lever 79, similar in construction to the lever 74, so that by moving the lever on its pivotal axis, the arms 61 may be tilted on the rod or shaft 60, thus to raise or lower the rake bars 64.

Secured to one end of the winding drum 24, is a sprocket wheel 80 having a serrated face 81 for engagement with a clutch member 82, the latter being normally held out of engagement with the serrated face of the sprocket wheel 80 by a coil spring 83. Motion is transmitted from the shaft 35 to the winding drum 24 by a sprocket chain 84 which engages a sprocket wheel 85 on the shaft 35 and the sprocket wheel 80, as best shown in Fig. 3 of the drawings.

Pivotally mounted at 86 on one of the side bars of the truck, is a bell crank lever 87, one arm of which bears against a forked shipper rod 88, while the other end thereof is connected through the medium of a rod 89 with the adjacent arm of a bell crank lever 90 pivotally mounted on the standards 17. Secured to the other end of the lever 90, is a vertically disposed rod 91 having its upper end extended through an aperture in a foot lever 92 and provided with a terminal head between which and the foot lever is interposed a coil spring 93. The tension of the spring 93 is such that when the foot lever is depressed, the shipper lever 88 will be tilted laterally on its pivotal axis 94 so as to throw the clutch members 81 and 82 into engagement with each other, without compressing said spring.

Pivotally mounted at 95 on one of the side bars of the truck frame, is a clutch releasing device, preferably in the form of a lever 96 having its free end inclined or beveled and adapted to enter a circumferential groove 97 formed in the clutch member 82. Pivotally connected with the intermediate portion of the clutch releasing member 96, is a rod 98, the upper end of which extends through a keeper 99 secured to the lower portion of the rack 10 and terminates in an enlarged head 100.

The operation of the device is as follows: As the machine travels over a field, the forks 28 gather the shocks, while the rake bars 64 feed said shocks to the conveyer for delivery to the rack 10. When the rack is filled, the operator depresses the foot lever 92 which throws the clutch members 81 and 82 into engagement with each other, thus transmitting motion from the rear ground wheels to the drum 24. As the drum 24 rotates, the cords or cables 20 will be wound thereon, thus exerting an upward pull on the free end of the rack 10 so as to tilt the latter and permit the discharge of the load, the arm or trip device 16 engaging the ground and automatically opening the end gate, as before stated. When the rack assumes the position shown in Fig. 1 of the drawings, the head 100 of the rod 98 will exert an upward pull on the clutch releasing member 96 so as to cause the active or inclined end of said clutch to enter the groove 97 and separate the clutch members 81 and 82, and thus allow the rack to descend to its normal position, as shown in dotted lines in Fig. 1 of the drawings.

In order to prevent a too rapid descent of the forward end of the rack 10, one end of the drum 24 is provided with a roller 101 on which is mounted a brake-band 102, said brake-band being connected through the medium of a rod with a foot operated lever 103 disposed at the front end of the machine. A steering head 104 is arranged in front of the standards 17 with its lower end provided with a worm wheel 105 which meshes with a worm 106 carried by a transverse shaft 107. Suitable pulleys 108 are secured to the opposite ends of the shaft 107 and to which are connected chains or other flexible elements 109 for attachment to the opposite ends of the front axle so that by operating the steering head, the front axle may be tilted on its pivotal axis to effect the guiding of the machine. Suitable caster wheels 110 are also pivotally mounted on the front end of the frame 27 to assist in guiding the machine. The machine may be propelled in any suitable manner, but it is preferred to provide the forward end of the truck with swingletrees 111 to permit the attachment of draft animals for this purpose. Attaching straps or chains 112 are preferably secured to the opposite ends of the transverse bar 29 for attachment to the collars of the draft animals so as to form in effect a hold-back and prevent slipping of the machine when traveling down a hill.

While I have shown and described a plurality of rake bars for feeding the shocks from the gathering device to the elevator or conveyer, it will be understood that the rake bars may be dispensed with without departing from the spirit of the invention.

From the foregoing description, it is thought that the construction and operation of the device will be readily understood by those skilled in the art and further description thereof is deemed unnecessary.

Having thus described the invention, what is claimed as new is:

1. A shock loader including a truck, a rack pivotally mounted on the truck and provided with a pivoted end gate, a gathering device arranged at the front end of the truck, means for advancing the shocks from the gathering device to the rack, means for tilting the rack, and a locking member pivotally mounted on the end gate of the rack and provided with an arm adapted to engage the ground to release said end gate when the rack is tilted to effect the dumping of the load.

2. A shock loader including a wheeled truck, a rack pivotally mounted on the truck, a gathering device carried by the forward end of the truck, a conveyer for delivering the shocks from the gathering device to the rack, a winding drum, a cable forming a connection between the forward end of said truck and said drum, and means for transmitting motion from one of the wheels of the truck to the drum, thereby to wind the cable on the drum and tilt the forward end of the rack to effect the dumping of the load.

3. A shock loader including a wheeled truck, a rack pivotally mounted on the truck, a gathering device carried by the forward end of the truck, a conveyer for delivering the shocks from the gathering device to the rack, a winding drum, a sprocket wheel secured to the winding drum and provided with a clutch member, means for transmitting motion from one of the wheels of the truck to said sprocket wheel, a mating clutch member, a cable connecting the drum and forward end of the rack, means for moving the clutch members into engagement with each other to wind the cable on the drum and elevate the rack, and means operable by the rack for disengaging said clutch members when the rack is in elevated position.

4. A shock loader including a wheeled truck, a rack pivotally mounted on the truck, a gathering device arranged at the front end of said truck, means for advancing the shocks from the gathering device to the rack, a winding drum, a flexible connection between the drum and the forward end of the rack, means for transmitting motion from the truck to the drum to elevate the forward end of the rack, and means operable by the rack for disconnecting the drum from the transmission means when said rack is tilted.

5. A shock loader including a wheeled truck, a rack pivotally mounted on the truck, a gathering device carried by said truck, means for advancing the shocks from the gathering device to the rack, a drum journaled on the truck, spaced standards secured to said truck, a shaft journaled in said standards and provided with rollers, a flexible element having one end thereof connected with the drum and its other end extending over the rollers for attachment to the forward end of the rack, a sprocket wheel secured to the drum and provided with a clutch member, means for transmitting motion from the drum to the sprocket wheel, a mating clutch member, means for normally separating said clutch members, means for moving the clutch members into engagement with each other, thereby to wind the flexible element on the drum and elevate the rack, and means operable by the rack for disengaging the clutch members when said rack is tilted.

6. A shock loader including a wheeled truck, a rack pivotally mounted on the truck, a gathering device carried by said truck, means for transferring the shocks from the gathering device to the rack, spaced standards secured to the forward end of the truck, a shaft journaled in the upper end of the standards, a winding drum mounted on the truck, a sprocket wheel secured to the winding drum and provided with a clutch member, means for transmitting motion from the truck to said sprocket wheel, a mating clutch member, means for normally holding the clutch members out of engagement with each other, a flexible element having one end thereof secured to the drum and its other end extended over the shaft for attachment to the rack, means for moving the clutch members into engagement with each other to tilt the rack, a clutch releasing lever pivotally mounted on the truck, a keeper carried by the rack, and a rod extending through the keeper and operatively connected with the clutch releasing member for actuating the latter to disengage said clutch members when the rack is in dumping position.

7. A shock loader including a wheeled truck, a rack pivotally mounted on the truck, a gathering device carried by the front end of said truck, means for transferring the shocks from the gathering device to the rack, spaced standards secured to the forward end of the truck, a shaft journaled in the upper end of said standards, a winding drum journaled on the truck and having one end thereof provided with a pulley, a sprocket wheel secured to the other end of the shaft and provided with a clutch member, a cable having one end thereof secured to the drum and its other end extended over the shaft for attachment to the forward end of the rack, a mating clutch member, means for normally and yieldably holding the clutch members separated, means for moving said clutch members into engagement with each other to tilt the rack, and a brake-band engaging the pulley for retarding the movement of the rack when the latter is returned to normal position.

8. A shock loader including a wheeled truck, a rack pivotally mounted on the truck, a gathering device, means for transferring the shocks from the gathering device to the rack, a winding drum, spaced standards secured to the forward end of said truck, a shaft journaled in the upper ends of said standards, a flexible element having one end thereof secured to the drum and its other end passing over the shaft for attachment to the rack, a sprocket wheel secured to one end of the drum and provided with a clutch member, a mating clutch member, means for transmitting motion from the truck to the sprocket wheel, a shipper lever for moving the clutch members into engagement with each other, a bell crank lever operatively connected with the shipper lever, a second bell crank lever, a connection between said bell crank levers, and a foot piece operatively connected with the second bell crank lever.

9. A shock loader including a wheeled truck, a rack pivotally mounted on the truck, a frame pivotally mounted on the forward end of the truck, a gathering device, a pivotal connection between the gathering device and frame, spaced standards secured to the truck, a transverse shaft carried by said standards, an inclined conveyer resting on said shaft and extending to the gathering device for transferring the shocks from said gathering device to the rack, means for raising and lowering the gathering device, rake bars co-acting with the gathering device, a winding drum, a cable having one end thereof connected with the winding drum and its other end extending over the shaft and attached to the forward end of the rack, and means for transmitting motion from the truck to said winding drum.

10. A shock loader including a wheeled truck, a rack pivotally mounted on the truck, spaced standards secured to the forward end of said truck, a transverse shaft journaled on the upper ends of the standards, a frame pivotally connected with the truck at the base of said standards, a gathering device pivotally mounted on the free end of the frame, an inclined conveyer supported on the transverse shaft of the standards, uprights secured to the conveyer, arms pivotally connected with said uprights, a crank shaft carried by the arms, rake bars secured to the crank shaft, means for raising and lowering the gathering device, means for tilting the arms to elevate the rake bars, means for transmitting motion from the wheels of the truck to the conveyer and rake bars, respectively, and means for elevating the rack to effect the dumping of the load.

11. A shock loader including a wheeled truck, a rack pivotally mounted on the truck, spaced standards secured to the forward end of said truck, a transverse shaft connecting said standards, a frame pivotally connected with the truck at the base of the standards, a gathering device pivotally mounted on the free end of the frame, a conveyer having its lower end connected with said frame and its upper end resting on the transverse shaft, a second transverse shaft journaled on the truck frame, a third transverse shaft journaled on the pivoted frame, means for transmitting motion from the truck wheels to the second transverse shaft, means for transmitting motion from the second shaft to the third shaft, uprights secured to the conveyer, arms pivotally mounted on said uprights, a crank shaft journaled in the uprights, rake bars secured to the crank shaft, intermeshing gear wheels, one of which is connected with the conveyer, means for transmitting motion from the third shaft to said gear wheels, means for transmitting motion from the gear wheels to the crank shaft, and means for tilting the rack to effect the dumping of the load.

In testimony whereof, I affix my signature in presence of two witnesses.

JOHN P. HAMANN. [L. S.]

Witnesses:
  GEO. BROWER,
  WM. B. NOE.

---

Copies of this patent may be obtained for five cents each, by addressing the "Commissioner of Patents, Washington, D. C."